United States Patent [19]
Sailer et al.

[11] Patent Number: 5,876,837
[45] Date of Patent: Mar. 2, 1999

[54] EFFECT COATING MATERIAL AND EFFECT COATING SYSTEM, ESPECIALLY FOR VEHICLE BODIES, USING LIQUID-CRYSTALLINE INTERFERENCE PIGMENTS

[75] Inventors: Maria-Theresia Sailer; Martin Kirschbaum, both of Ulm; Christoph Mueller-Rees, Pullach, all of Germany

[73] Assignees: Daimler-Benz Aktiengesellschaft; Wacker-Chemie GmbH, both of Stuttgart, Germany

[21] Appl. No.: 737,620

[22] PCT Filed: May 18, 1995

[86] PCT No.: PCT/EP95/01895

§ 371 Date: Mar. 12, 1997

§ 102(e) Date: Mar. 12, 1997

[87] PCT Pub. No.: WO95/32248

PCT Pub. Date: Nov. 30, 1995

[30] Foreign Application Priority Data

May 24, 1994 [DE] Germany ............ 44 18 076.4

[51] Int. Cl.$^6$ ..................................... B32B 3/00
[52] U.S. Cl. ................ 428/195; 428/31; 428/207; 428/220; 252/299.01; 252/586
[58] Field of Search ............. 252/299.01, 586, 252/195; 428/206, 207, 220, 31

[56] References Cited

U.S. PATENT DOCUMENTS 4,132,464 1/1979 Maeno .
4,388,453 6/1983 Finkelmann et al. .
5,188,760 2/1993 Hikmet et al. .
5,442,025 8/1995 Spes et al. .

FOREIGN PATENT DOCUMENTS 2 340 359 2/1977 France .

OTHER PUBLICATIONS

"Cellulose–Based Liquid Crystalline Polymers; Esters of (Hydroxypropyl) Cellulose", S.N. Bhadani et al., 2322 Molecular Crystals and Liquid Crystals—Letters vol. 99 (1983), pp. 29–38.
International Search Report dated Sep. 27, 1995.

*Primary Examiner*—Elizabeth Evans
*Attorney, Agent, or Firm*—Evenson, McKeown, Edwards & Lenahan, P.L.L.C.

[57] ABSTRACT

An effect coating material and an effect coating, especially for vehicle bodies, containing interference pigments, in which the interference pigments are composed of three-dimensionally crosslinked, liquid-crystalline, main-chain polymers, which include main-chain mesogens having an at least approximately chiral nematic arrangement, and which are formed from at least one esterified cellulose ether.

43 Claims, No Drawings

EFFECT COATING MATERIAL AND EFFECT COATING SYSTEM, ESPECIALLY FOR VEHICLE BODIES, USING LIQUID-CRYSTALLINE INTERFERENCE PIGMENTS

The invention relates to interference pigments based on liquid-crystalline polymers according to claim 1, to an effect coating material according to the pre-characterizing clause of claim 19 and to commodity articles, especially motor vehicle bodies, which are painted therewith, according to the precharacterizing clause of claim 28. Moreover, the invention comprises a process for the preparation of the interference pigments according to claim 9. Liquid-crystalline polymers are already known, for example, from DE 40 08 076 A, EP 66 137 A and U.S. Pat. No. 5,188,760.

The customary automotive solid-colour paints generally involve, incorporated into a clear vehicle comprising synthetic resin, colour pigments which determine the desired coloration of the paint. The colour effect of these pigments is based on a spectrally selective absorption effect, so that a spectrally broad fraction of the incident—white—light is absorbed by the pigments and only a spectrally narrow fraction is reflected.

In the effort for brighter perceived colours, especially for vehicle bodies, the so-called effect finishes have been developed. In the case of one group thereof, the metallic paints, small metal flakes, inter alia, as pigments are incorporated by mixing into the paint vehicle. In the case of another group, coated mica particles are used as pigments. With these effect finishes it is possible to achieve a better brightness of colour than with the solid-colour paints; moreover, depending on the direction of incidence of light and/or direction of viewing, there is a slightly altered perceived colour, which is desirable. EP 383 376 A1 describes such an effect finish, in which small mica flakes are coated uniformly on all sides with a cross-linked, liquid-crystalline polymer (LCP) in chiral nematic arrangement. The coloured appearance of such pigments comes about by means of an interference phenomenon. The only light waves of the incident light which are reflected are those whose wavelength interferes with the equidistant interplanar spacings of the liquid-crystalline polymers, whereas the light fractions of other wavelengths pass through the transparent body of the paint and are absorbed by the—preferably—dark substrate. Plateletlike interference pigments of this kind, aligned parallel to the painted surface, have a defined first colour—base colour—when viewed orthogonally and a second, shorter-wave colour when viewed from an inclined direction. This viewing angle-dependent coloured appearance of the painted surface makes the coating system highly effective, and, for specific applications in which such colour effects are perceived positively by the customer, highly desirable. A disadvantage is the complex preparation of the interference pigments, making the effect coating material and, correspondingly, the effect finish on the commodity article very costly.

The preparation of interference pigments based on polysiloxanes has become known, confidentially, to the Applicant, these pigments each consisting wholly of small fragments of a thin crosslinked film of liquid-crystalline polymers. These interference pigments are colourless and transparently see-through. The colour effect which can be achieved with them is based on the regular structure and on the uniform arrangement of the molecules in the form of a liquid crystal and on the interference, which can be traced back thereto, of a certain spectral light fraction for which the pigment has a reflective action. The other light fractions pass through the pigment. By this means it is possible to achieve stunning colour effects of different kinds, depending on the configuration of the coating system and/or on the interference pigments and mixing thereof. Aside from the novel aesthetic colour effect of the coating system and of the coating material used therefor, this coating system also offers a series of technical advantages. Owing to their chemical composition, the interference pigments have a specific weight which is approximately equal to that of the vehicle of the pigments and/or the paint base. Therefore, there is no mass-related separation of pigments and paint base during the storage of the coating material or during its application by spraying using a high-speed rotating bell, as is observed in the case of conventional coating materials containing absorption pigments—mostly based on metal—having high specific weights. Since, moreover, the entire colour spectrum can be produced by mixing just a few types of interference pigments in different ratios at the painting plant, stock keeping on site can be limited to a few basic types of paints, thereby simplifying very considerably the logistics relative to the various paint colours. However, the polysiloxanes used for these liquid-crystalline polymers have the disadvantage that they have to be synthesized in a plurality of stages and from expensive starting materials. The interference pigments of the type discussed are obtained by knife-coating the polymers from the liquid or liquid-crystalline state onto a smooth substrate, for example onto a polished roller, thereby forming a thin film. As a result of the knife-coating procedure there is an alignment of the molecules within the film, namely into a homogeneous orientation; only after this orientation does the film exhibit an interference colour. In the shearing process of the liquid-crystalline polymers in the course of knife-coating, there is automatic establishment of equal interplanar spacings and, therefore, of diffraction structures having a colour-selective effect.

The basic shade of the interference pigments is determined by the perceived colour, or the colour which is established when the painted surface is viewed perpendicularly under perpendicular illumination. Since, with a beam path directed diagonally to the surface, the interplanar spacings—as a result of geometry—appear altered relative to the orthogonal beam direction, the perceived colour shifts towards a different colour, which in the colour spectrum is displaced in the direction of shorter wavelengths, depending on the relative direction of viewing of the surface. In other words, depending on the position of a certain part of the surface relative to the beam path of the viewer, that part of the surface appears in the basic colour or in the different, shorter-wave colour. Interference pigments of the basic colour red, for example, can "flip" into the colour green; with other interference pigments, a flip in colour ("colour flop") between green and blue can be produced.

The intensity of the colours which can be perceived in this context is all the greater the darker the colour of the substrate which carries the colour-defining coating layer, although the shade of this substrate must be determined by colour pigments having an absorptive effect. The basis for this, in fact, is that the light fractions passing through the interference pigments are absorbed more or less completely by the dark substrate, and are absorbed all the more the darker the substrate.

One condition for the occurrence of liquid-crystalline phases is a rigid mesogenic molecular structure. The repeating units of liquid-crystalline polymers comprise the mesogenic units. The two most frequently realized molecular structures are the side-chain LC polymers, in which the mesogenic units are chemically fixed as side chains on the polymer backbone, and the main-chain LC polymers, in which the mesogenic units form the polymer backbone, or part of the polymer backbone. In addition to the homopolymers, it is possible to prepare a large number of copolymers which may contain different mesogenic units.

The object of the invention, in relation to the various categories taken as the basis for the generic types, namely interference pigments, process for their preparation, coating material and painted commodity article, is to find an inexpensive and readily available material base which gives rise to the same colour effects and brightness in the coating system and which is easier to prepare, i.e. can be prepared in fewer synthesis steps, and which requires only one component in order to prepare a chiral nematic polymer.

This object is achieved in accordance with the invention by the characterizing features of claim 1 in relation to the interference pigments taken as basis, by the characterizing features of claim 9 in relation to the process for their preparation, by the characterizing features of claim 19 in relation to the coating material, and by the characterizing features of claim 28 in relation to the commodity article taken as basis.

The main-chain polymers employed as interference pigments consist of oriented, three-dimensionally crosslinked substances of liquid-crystalline structure having a chiral nematic (cholesteric) phase at room temperature which facilitates orientation. Orientation in the chiral nematic phase is permanently fixed by means of crosslinking by UV light.

The colour shade to be brought about by the interference pigments is determined by the interplanar spacing in the crosslinked polymer of which the interference pigment consists. In fact, the colour shade brought about is that whose wavelength coincides with the interplanar spacing. In order not to have to provide a separate polymer for each colour shade, an advantageous phenomenon is exploited: namely that, when noncrosslinked polymers are mixed together, each having different interplanar spacings in the mixture, a new, uniform interplanar spacing is established which lies between these interplanar spacings. It is therefore expedient if the composition which is to be knife-coated onto the substrate during film formation is mixed from at least two different, noncrosslinked liquid-crystalline polymers—esterified cellulose ethers—with the interplanar spacings being greater in one polymer and smaller in the other polymer than the wavelength of the desired interference colour of the interference pigment which is to be prepared, and the mixing ratio of the polymers, in contrast, being chosen in analogy to the differences of the interplanar spacings of the individual polymers from the wavelength of the desired interference colour.

Another option for establishing the desired interference colour of the interference pigment to be prepared consists in influencing, in the film knife-coated onto the substrate, in its as yet uncrosslinked stage, the pitch of the helix of the chiral-nematically oriented molecules and thus the interplanar spacing in the film by heat treatment of the film in such a way that the interplanar spacing corresponds to the wavelength of the desired interference colour. The film is subsequently crosslinked by irradiation with UV light and the interplanar spacing established is fixed permanently.

The film produced in connection with the preparation of the interference pigments should at least after curing have a thickness of from 5 to 200 $\mu$m. By comminuting the cured film to give small particles, the interference pigments required in the present case are produced in platelet form, in which the main-group mesogens preferably have a chiral nematic order. The plateletlike interference pigments which can be used have a platelet diameter in the size order of from 5 to 200 $\mu$m; smaller or larger particles produced during comminution of the cured film must be systematically removed, for example by sieving operations. When a basecoat pigmented with them is applied to a surface, the plateletlike pigments automatically align themselves parallel to the surface as a result of flow processes in the basecoat.

The intensity of the interference colours is all the greater the darker the colour of the absorbing substrate which carries the colour-defining coating layer. Consequently, an expedient embodiment is to design the substrate carrying the colour-defining coating layer such that it is as dark as possible, preferably black.

Another expedient embodiment of the coating system can be seen in keeping the substrate of the colour-defining coating layer in a shade, brought about by means of absorption pigments, which is such that it approximately coincides with the basic colour or with the "flop" colour of the interference pigments. This gives the colour coincident with the substrate a particularly intense and brilliant appearance. Although in the other viewing direction or illumination direction the colour of the coated surface also appears in the respective substrate shade, it is tinted in the other colour of the interference pigments and is strewn with finely dispersed points of sparkle. In addition, it is also possible, using absorption pigments, to give the substrate carrying the colour-defining coating layer neither a dark shade nor a shade in one of the colours of the interference pigments but in a third shade, which for example is in the colour spectrum between both colours or has a particularly large spectral distance from at least one of the two colours. In this way it is possible to give the coated article a three-way perceived colour.

As an alternative or else a supplement to giving the substrate which carries the colour-defining coating layer a shading appropriate to its use, it is also conceivable to mix absorption pigments into the effect paint containing—in some instances possibly different—interference pigments. By admixing dark absorption pigments to the novel effect paint it is possible to obtain an impression wholly comparable with that given by a dark substrate. The situation is similar when light-coloured absorption pigments are mixed in; they bring about an attenuation of the colour flop and of the individual colour intensities. By admixing absorption pigments in one of the effect colours it is possible to achieve an intensification of this perceived colour at the expense of the colour effect of the other effect colour. The admixing of absorption pigments to the effect paint is advisable if the intention is to paint a light-coloured substrate, or even a substrate having a metallic gleam, with effect paint. A task of this kind may be required, for example, when repainting old vehicles or in the course of refinish operations.

In the text below the invention is illustrated in more detail with reference to an example:

Production of the colour-imparting film:

15 ml of vinylacetyl chloride were run dropwise into a solution of 5 g of O-(2-hydroxypropyl)cellulose of molar mass of 100,000 (Aldrich, Steinheim, order no. 19.188-4) and 6 ml of N,N-dimethylaniline in 150 ml of absolute dioxane. After the mixture had been stirred at room temperature for 1 h, it was heated to 100° C. and held at this temperature for 4 h. The reaction mixture was subsequently cooled to room temperature and poured into 1 L of distilled water. A water-insoluble residue was formed which was taken up in 200 ml of acetone and reprecipitated a number of times from water/acetone. The end product obtained was 6.25 g of a viscous white substance.

A photoinitiator (Darocur 4265 from Ciba-Geigy) was added to the substance, and this composition was applied, using an automatic film-drawing apparatus, to a black-primed metal test panel in a film thickness of about 10 $\mu$m at a temperature of 70° C. In the course of application the film was subjected to mechanical shearing. When the film subsequently cured by means of UV light was viewed perpendicularly under perpendicular illumination, it showed a blue colour (reflection wavelength $\lambda$=470 nm). In this case no colour flop was observed since this colour was in the UV region.

Preparation of the interference pigments:

The colour-imparting film was scraped off from the substrate using a bladelike tool to give flakelike structures. The flakes were subsequently comminuted with an air jet mill (Alpine); it is also possible to employ other mills, incorporating gentle heating, for plastic parts. The resulting milled material was then sieved, and a sieve fraction having a mean size of about 30 $\mu$m was used for further processing.

Preparation of the paint:

The interference pigments obtained were mixed with a clearcoat in a ratio of from 1:7 to 1:20 parts by weight. The clearcoat used was a two-component topcoat based on polyurethane (e.g. 2K-PU-Decklack 0111 from BASF Lacke+Farben, Münster-Hiltrup, or a "Standox" coating material from Herberts, Wuppertal).

The advantages achieved with the subject-matter of the invention consist, in particular, in the fact that an abundant, favourably priced biopolymer is available as starting material for the interference pigments. The fact that the temperature range within which the main-chain polymers exhibit the chiral nematic phase is in the roomtemperature range considerably facilitates orientation, in respect of the energy requirement necessary for the purpose. Overall, the advantages associated with the invention may be summed up again in the following list:

it is possible to employ inexpensive and readily available starting materials;

moreover, the starting materials employed are based on renewable raw materials, based on the natural substance cellulose;

the hydroxypropylcellulose specifically employed is an industrial product available on the market which is already produced on a large scale and is obtainable at comparatively favourable prices;

the preparation of the polymers for the interference pigments is particularly simple by virtue of the fact that only one chiral component is required and that only a one-stage reaction is required;

the processing of the prepared polymers to give interference pigments is also simple since, owing to the occurrence of the chiral nematic phase at room temperature, the energy requirement for orientation is relatively low;

in comparison to conventionally pigmented paints, by virtue of a narrow-band reflectance curve, a greater brightness of colour can be achieved with the interference pigments;

where no aromatic components are present, the paints should be expected to be of greater light stability since they absorb fewer fractions of light in the visible and in the UV range;

simple recycling of the new paints is also conceivable, since in comparison to conventionally pigmented paint systems the mixing of components is possible.

We claim:

1. An article coated with a multilayer coating wherein the multilayer coating comprises a color-defining layer which comprises pigments, at least some of which are plate shaped interference pigments which are aligned approximately parallel to the surface of the article and comprise liquid-crystalline, three-dimensionally crosslinked main chain polymers, which comprise main-chain mesogens having an at least approximately chiral nematic arrangement, wherein:

the liquid-crystalline main-chain polymers comprise at least one esterified cellulose ether, the esterified cellulose ether is prepared from cellulose ethers having a molar mass of from 500 to 1,000,000, the cellulose comprises anhydroglucose units having an average molar degree of substitution of from 2 to 5 which are etherified with hydrocarbon chains, and the cellulose ether has an average molar degree of substitution of from 1.5 to 3 which are esterified with unsaturated carboxylic acid residues.

2. The article according to claim 1, wherein the hydrocarbon chains each comprise 2 to 10 carbon atoms.

3. The article according to claim 1, wherein the cellulose ether is additionally esterified with saturated carboxylic acid residues.

4. The article according to claim 1, wherein the cellulose ether comprises 2 to 5 propylene oxide side chain units.

5. The article according to claim 1, wherein the unsaturated carboxylic acid residues are selected from the group consisting of methacrylic acid, crotonic acid, vinylacetic acid, maleic acid, fumaric acid and undecenoic acid.

6. The article according to claim 1, wherein the cellulose ether comprises an O-(2-hydroxypropyl) cellulose esterified with vinylacetic acid residues.

7. The article according to claim 1, wherein the color-defining layer is applied to a dark substrate.

8. The article according to claim 1, wherein the color-defining layer is applied to a substrate which is the same color as a shade of the color-defining layer.

9. The article according to claim 1, wherein the color-defining layer comprises interference pigments having different interplanar spacings.

10. The article according to claim 1, wherein the interference pigments have a film thickness of from 5 to 200 $\mu$m.

11. The article according to claim 1, wherein the plate shaped interference pigments have a particle diameter of from about 5 to about 100 $\mu$m.

12. The article according to claim 1, wherein the article is a vehicle body.

13. Interference pigments for colored coating materials, comprising liquid-crystalline, three-dimensionally crosslinked main-chain polymers, which comprise main-chain mesogens having an at least approximately chiral nematic arrangement, wherein:

the liquid-crystalline main-chain polymers comprise at least one esterified cellulose ether, the esterified cellulose ether is prepared from cellulose ethers having a molar mass of from 500 to 1,000,000, the cellulose comprises anhydroglucose units which are etherified with an average molar degree of substitution of from 2 to 5 with hydrocarbon chains, and the cellulose ether is esterified with an average molar degree of substitution of from 1.5 to 3 with unsaturated carboxylic acid residues.

14. The interference pigments according to claim 13, wherein the hydrocarbon chains each comprise 2 to 10 carbon atoms.

15. The interference pigments according to claim 13, wherein the cellulose ether is additionally esterified with saturated carboxylic acid residues.

16. The interference pigments according to claim 13, wherein the cellulose ether comprises 2 to 5 propylene oxide side chain units.

17. The interference pigments according to claim 13, wherein the unsaturated carboxylic acid residues are selected from the group consisting of methacrylic acid, crotonic acid, vinylacetic acid, maleic acid, fumaric acid and undecenoic acid.

18. The interference pigments according to claim 13, wherein the cellulose ether comprises an O-(2-hydroxypropyl) cellulose esterified with vinylacetic acid residues.

19. The interference pigments according to claim 13, wherein the interference pigments have a film thickness of from about 5 to about 200 $\mu$m.

20. The interference pigments according to claim 13, wherein the interference pigments are plate shaped and have a particle diameter of from about 5 to about 100 $\mu$m.

21. A process for preparing plate shaped interference pigments of a desired color, comprising the steps of:
   applying uncrosslinked liquid-crystalline main-chain polymers in a liquid state onto a smooth substrate to produce a film having an at least approximately chiral nematic arrangement,
   curing and three-dimensionally crosslinking the film,
   removing the film from the substrate and comminuting the film into plate shaped particles, and
   separating out particles which are oversize and undersize with a particle size-selective separation process to obtain plate shaped interference pigments,
   wherein:
      the liquid-crystalline main-chain polymers comprise at least one esterified cellulose ether,
      the esterified cellulose ether is prepared from cellulose ethers having a molar mass of from 500 to 1,000,000,
      the cellulose comprises anhydroglucose units which are etherified with an average molar degree of substitution of from 2 to 5 with hydrocarbon chains, and
      the cellulose ether is esterified with an average molar degree of substitution of from 1.5 to 3 with unsaturated carboxylic acid residues.

22. The process according to claim 21, wherein the liquid-crystalline main-chain polymers are applied in a liquid state dissolved or suspended in a solvent.

23. The process according to claim 21, wherein the liquid-crystalline main-chain polymers are applied in a liquid state as a melted powder.

24. The process according to claim 21, wherein the hydrocarbon chains each comprise 2 to 10 carbon atoms.

25. The process according to claim 21, wherein the cellulose ether is additionally esterified with saturated carboxylic acid residues.

26. The process according to claim 21, wherein the cellulose ether comprise 2 to 5 propylene oxide side chain units.

27. The process according to claim 21, wherein the unsaturated carboxylic acid residues are selected from the group consisting of methacrylic acid, crotonic acid, vinylacetic acid, maleic acid, fumaric acid and undecenoic acid.

28. The process according to claim 21, wherein the cellulose ether comprises an O-(2-hydroxypropyl) cellulose esterified with vinylacetic acid residues.

29. The process according to claim 21, wherein the liquid-crystalline main-chain polymers are applied by knife-coating onto the substrate.

30. The process according to claim 21, wherein the uncrosslinked liquid-crystalline main-chain polymers comprise a mixture of at least two different uncrosslinked liquid-crystalline polymers comprising esterified cellulose ethers, wherein the different polymers have different interplanar spacings, wherein the interplanar spacings in one polymer are greater and in the other polymer are smaller than the wavelength of the desired color of the interference pigment in order to establish an interplanar spacing of the polymer mixture which is a weighted average of the interplanar spacings of the individual polymers and corresponds to the wavelength of the desired color, and wherein the polymers are mixed at a ratio corresponding to the differences between the respective interplanar spacings of each polymer and the wavelength of the desired color.

31. The process according to claim 21, wherein the chiral nematic pitch of the helix of the uncrosslinked liquid-crystalline polymer, and the resulting interplanar spacings in the film, vary with temperature, said process further comprising adjusting the temperature such that the interplanar spacing corresponds to the wavelength of the desired color.

32. The process according to claim 21, wherein the film is applied in a thickness of from 5 to 200 $\mu$m.

33. The process according to claim 21, wherein the plate shaped interference pigments have a particle diameter of from about 5 to about 100 $\mu$m.

34. A coating material for painting an article, comprising interference pigments suspended in a paint vehicle, wherein at least some of the interference pigments are plate shaped and automatically align themselves approximately parallel to the surface of the article during application of the coating material, wherein the interference pigments comprise liquid-crystalline, three-dimensionally crosslinked main-chainpolymers, which comprise main chain mesogens having an at least approximately chiral nematic arrangement, and wherein:
   the liquid-crystalline main-chain polymers comprise at least one esterified cellulose ether,
   the esterified cellulose ether is prepared from cellulose ethers having a molar mass of from 500 to 1,000,000,
   the cellulose comprises anhydroglucose units which are etherified with an average molar degree of substitution of from 2 to 5 with hydrocarbon chains, and
   the cellulose ether is esterified with an average molar degree of substitution of from 1.5 to 3 with unsaturated carboxylic acid residues.

35. The coating material according to claim 34, wherein the hydrocarbon chains each comprise 2 to 10 carbon atoms.

36. The coating material according to claim 34, wherein the cellulose ether is additionally esterified with saturated carboxylic acid residues.

37. The coating material according to claim 34, wherein the cellulose ether comprises 2 to 5 propylene oxide side chain units.

38. The coating material according to claim 34, wherein the unsaturated carboxylic acid residues are selected from the group consisting of methacrylic acid, crotonic acid, vinylacetic acid, maleic acid, fumaric acid and undecenoic acid.

39. The coating material according to claim 34, wherein the cellulose ether comprises an O-(2-hydroxypropyl) cellulose esterified with vinylacetic acid residues.

40. The coating material according to claim 34, wherein the coating material comprises interference pigments with different interplanar spacings.

41. The coating material according to claim 34, wherein the interference pigments have a thickness of from 5 to 200 μm.

42. The coating material according to claim 34, wherein the plate shaped interference pigments have a particle diameter of from about 5 to about 100 μm.

43. A vehicle body coated with the coating material according to claim 34.

* * * * *